United States Patent [19]

Houdard et al.

[11] Patent Number: 4,553,144
[45] Date of Patent: Nov. 12, 1985

[54] GROUND SURVEILLANCE DOPPLER RADAR

[75] Inventors: Charles Houdard; Guy Le Parquier, both of Boulogne-Billancourt, France

[73] Assignee: LMT-Radio Professionnelle, Boulogne-Billancourt, France

[21] Appl. No.: 443,935

[22] Filed: Nov. 23, 1982

[30] Foreign Application Priority Data

Nov. 24, 1981 [FR] France .............................. 81 21958

[51] Int. Cl.[4] .............................................. G01S 13/52
[52] U.S. Cl. .................................... 343/7.7; 343/5 SA; 343/17.1 R
[58] Field of Search ................. 343/5 SA, 7.7, 8, 9 R, 343/17.1 PF, 455, 5 R, 17.1 R; 364/461

[56] References Cited

U.S. PATENT DOCUMENTS

| 3,617,997 | 11/1971 | Maass et al. | 343/7.7 |
| 3,721,980 | 3/1973 | Oister | 343/7.7 |
| 3,728,725 | 4/1973 | Bauer | 343/9 |
| 3,787,848 | 1/1974 | Laundry et al. | 343/17.1 PF |
| 3,898,656 | 8/1975 | Jensen | 343/7.7 |
| 4,057,800 | 11/1977 | Ganz | 343/8 |
| 4,225,864 | 9/1980 | Lillington | 343/7.7 |

FOREIGN PATENT DOCUMENTS 1523235 9/1977 Fed. Rep. of Germany .
2306453 10/1976 France .

Primary Examiner—Salvatore Cangialosi
Assistant Examiner—K. R. Kaiser
Attorney, Agent, or Firm—Oblon, Fisher, Spivak, McClelland & Maier

[57] ABSTRACT

The invention relates to Doppler radar making it possible to subject the ground to surveillance.

It consists of providing a conventional Doppler radar having a transmitter, a receiver, processing means making it possible to supply a binary signal indicating the presence or absence of a moving target in the given distance gate series and a display screen with means making it possible to take account of certain relative danger criteria, as a function of the distance at which the targets are located and as a function of the speed at which they are moving. These means make it possible to control the screen, in order that the relative danger is displayed in the form of an overbrightness for the targets considered dangerous.

It makes it possible to improve the display conditions of ground surveillance Doppler radars.

10 Claims, 5 Drawing Figures

GROUND SURVEILLANCE DOPPLER RADAR

BACKGROUND OF THE INVENTION.

The present invention relates to ground surveillance Doppler radar making it possible to detect or locate moving targets travelling on the surface of the ground between natural obstacles, which cause fixed echoes.

In known manner, such a Doppler radar transmits recurrent pulses and receives these pulses after reflection on a large number of obstacles located in the scanning field of the transmitting-receiving antenna.

A double processing of these signals is performed in order to locate interesting moving targets. Firstly, a system of gates is used, which subdivides the signal received in time, so as to discriminate a series of areas distributed in a regular manner in the field under surveillance. In certain very simplified cases, a single gate is used, which defines a range of given depth, which can be displaced at random by the operator in the field of range of the radar.

This is followed by a frequency analysis on the signals from a group of successive pulses in order to obtain a spectrum corresponding to a moving object having a given radial speed and located in the sector corresponding to the selected gate.

The signal from the spectrum analyzer is processed in a threshold circuit in order to discriminate this signal from the noise. The output signal from the discriminator is a binary signal which, for each successive distance gate, gives an information bit, whose value indicates a detection or a nondetection. These signals are processed and applied to a display means making it possible to locate the thus detected moving targets. However, among the detected targets, certain of them have a relative danger as a function of the distance at which they are located and as a function of the radial speed at which they travel, whereby said two criteria can be combined. The display means used for this type of radar do not reveal this danger.

SUMMARY OF THE INVENTION

In order to overcome this difficulty, the invention proposes a ground surveillance Doppler radar of the type comprising a transmitter for transmitting recurrent pulses of given frequency, a receiver for receiving these pulses subject to a Doppler modulation and supply an incoming signal formed from video frequency carrier pulses of the same modulation, storage and selection means for separating in said incoming signal at least one group of video frequency recurrent pulses corresponding to a given distance gate, spectral analysis means for forming a signal indicating the Doppler modulation lines of the pulses from said pulse group, a first threshold circuit for discriminating these lines from the noise supplying a signal indicating the presence or absence of moving targets in the distance gates and a display means making it possible to locate the targets, wherein it comprises a discriminator making it possible to classify the detected targets as a function of their speed in a system of predetermined relative danger square wave pulses, a second threshold circuit receiving k successive binary informations relative to each distance gate for each input signal making it possible to store these k informations (k an integer equal to or greater than 2) and supplying a binary signal indicating the presence or absence of a target for each relative danger range with a probability of 1 among k (1 being an integer equal to or below 2), a storage circuit making it possible to independently store the informations contained in the signals relative to each danger range for each distance gate and supply an output signal containing the informations for all the distance gates in sequential series for each danger range, a synchronizing and control circuit controlling the storage circuit, a scanning control circuit controlled by the synchronizing circuit, a matrix-type fluorescent screen, whose first group of electrodes is controlled by the scanning control circuit and whereof a second group of electrodes is controlled by the output signal of the storage circuit via an interface circuit and thus makes it possible to locate the targets and distinguish those representing the greatest danger by an overbrightness on the screen.

The features and advantages of the invention will become apparent from the following non-limitative description of an embodiment, as well as the attached drawings.

DETAILED DESCRIPTION OF THE INVENTION

Figure 1:
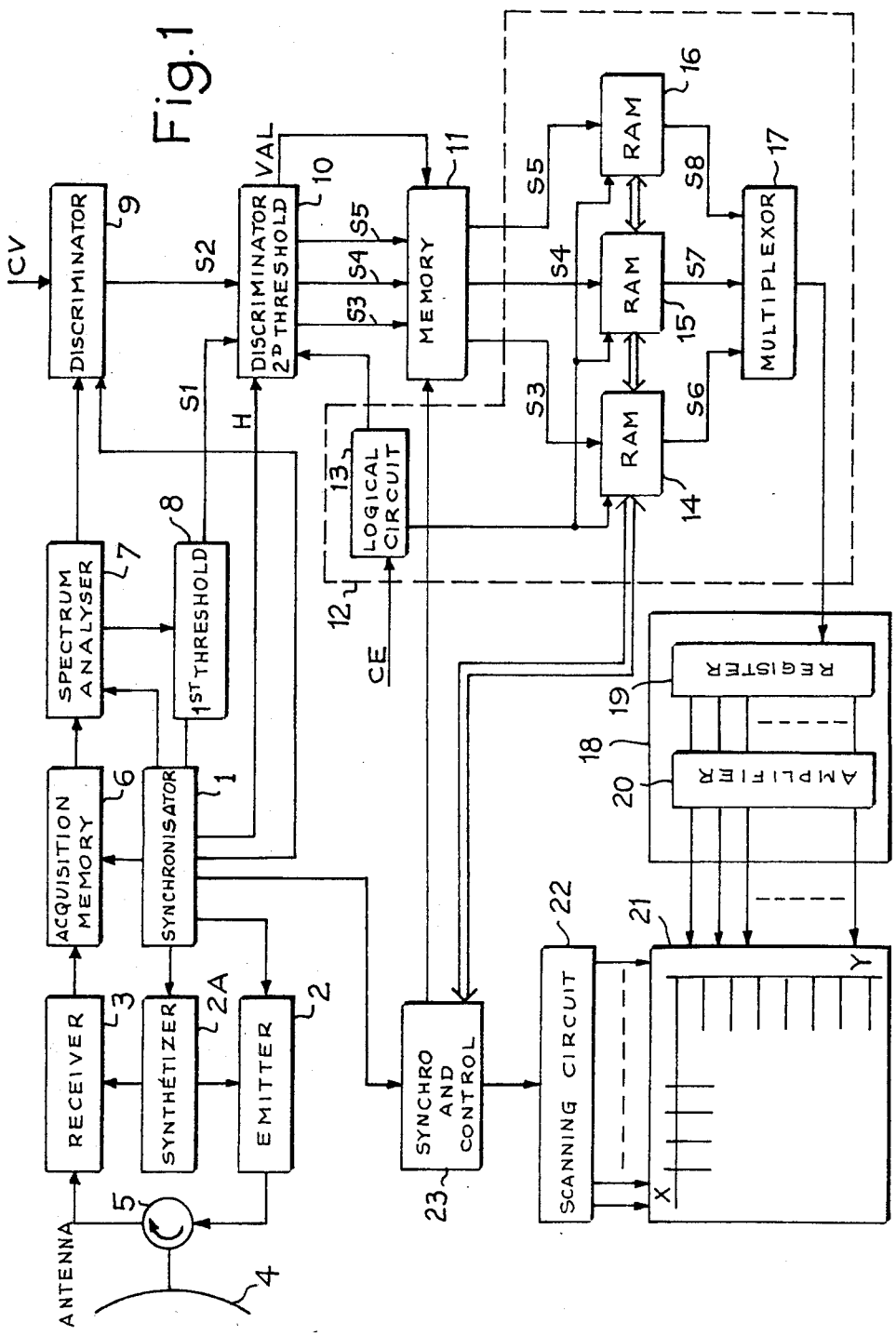
FIG. 1 is a block diagram of a ground surveillance Doppler radar, according to the invention.

The Doppler radar, whose block diagram is shown in FIG. 1, comprises a central synchronizer 1 controlling the complete system. In per se known manner, it also comprises a transmitter 2, a synthesizer 2A, a receiver 3 and an antenna 4 making it possible to transmit or receive signals by means of a circulator 5.

Receiver 3 supplies a demodulation signal comprising a sequence of video frequency pulses characteristic of the landscape observed. It is applied to an acquisition and storage system 6, which has a double function. Firstly, it selects, the time range, each corresponding to a given distance counted from the antenna 4. This makes it possible to divide the space from the said antenna into a given number N of zones, which are each separately scanned in order to determined whether or not there is a moving target in one or more of them. Then, for each of these zones, it selects a number N of receiving pulses, which themselves correspond to N recurrent pulses from the transmitter. This number then makes it possible to extract the Doppler frequency with an adequate precision and signal-to-noise ratio. For this purpose, the acquisition and storage system 6 uses signals coming from synchronizer 1 and which make it possible to select time range and the number of recurrences. This system operates in accordance with a known sequential process, which makes it possible to obtain at the output, the sequence of signals corresponding to the different distance gates and each comprising N video frequency pulses corresponding to the N successive recurrences. These signals are applied to the input of a spectrum analyzer circuit 7 controlled by the synchronizing circuit 1 and at the output there is a larger or smaller number of spectral lines for each of the distance gates.

A first discrimination is carried out by means of a first threshold circuit 8, which receives the output signal from analyzer 7 and which makes it possible to give an all or nothing response for each of the distance gates. Processing up to this stage is of a relatively conventional nature and leads at the output of threshold circuit 8 to a binary signal S1, giving for each of the successive distance gates an information bit (i.e. n bit for n gates), whose value indicates a detection or a non-detection.

A discriminator 9 connected to the output of spectrum analyzer 7 makes it possible to process the signals which it receives in order to obtain at the output a signal S2 indicating a response by all or nothing complying to a predetermined relative danger criterion and chosen as a function of the speed of the target and the distance at which it is located. Thus, two relative danger range, are discriminated corresponding to slow targets and fast targets.

The signals S1 and S2 from circuits 8 and 9 are received at the input of the threshold discriminator circuit 10, which also receives a synchronizing signal from synchronizer 1 enabling it to take account of these signals at the significant times. For each distance gate, processing consists of adding the k bits corresponding to the k successive measurements and uses as the decision criterion regarding the presence of a moving target, the fact that the thus obtained sum is equal to or greater than a threshold 1, which is obviously between 1 and k. In order to decorrelate the measurements, the transmitting frequency is changed beforehand between each of the k successive measurements. This frequency change takes place in a relatively narrow band, so that the Doppler frequency determined by the spectrum analyzer 7 does not have a large sweep, so that it is unnecessary to adapt the analyzer according to the transmitting frequency.

A buffer store 11 receives the output signals S3, S4, S5 from the discriminator circuit 10 in an asynchronous manner and makes it possible to simultaneously transmit these signals on the instruction of a validation signal VAL from discriminator 10 to memory circuit 12. This memory is entirely transparent with respect to the transmitted signals and is only used for changing their transmission timing.

Memory circuit 12 comprises at least three random-access memories or RAM 14, 15, 16 making it possible to write and then read the data respectively contained in signals S3, S4 and S5 for the n distance gates and the n bearing values of the antenna representing the total bearing sweep. Memory 14 contains the coding of the position of the fixed echoes detected in the group of distance gates for each of the bearing values of the antenna. Memory 15 contains the coding of the position of the slow moving echoes detected in the group of distance gates for each of the bearing values of the antenna, whilst memory 16 contained the coding of the position of the fast moving echoes for each of the bearing values of the antenna. A logic circuit 13 makes it possible to inhibit the writing input of the first memory as a result of an external instruction $\overline{CE}$.

The output signals S6, S7 and S8 of these memories 14, 15, 16 are linked with the inputs of a multiplexer 17. The data relative to each danger range signal (fixed, slow and fast targets) are mutiplexed and suppied to an interface circuit constituted by a series-parallel shift register 19 and a group of amplifiers 20 making it possible to amplify the signals transmitted by the register and supply them to electrodes Y corresponding to the anodes of a screen 21. The latter is a matrix-type graphics fluorescent screen. Thus, it conventionally comprises a system of n electrodes X materializing the bearing of the antenna, constituted by control grids and a system of n electrodes Y materializing the distance gates constituted by phosphorus pellets. The electrons emitted by a cathode are accelerated and controlled by the grids and bombard the phosphorus pellets.

A scanning control circuit 22, which is controlled by a synchronizing and control circuit 23 supplies screen scanning signals, which are applied to electrodes X simultaneously with the data change on electrodes Y.

Signal S6 contains the data contained in signals S7 and S8. Thus, when the screen receives information relative to signal S6, then signal S7 and then signal S8, the first image representing the fixed and moving echoes, the second image representing the slow moving echoes and the third image representing the fast moving echoes, an overbrightness appears for the slow and fast moving echoes, because they are respectively contained in signals S6, S7 and S6, S8. Furthermore, on transmitting signal S8 twice and signal S7 once with the aid of multiplexer 7, three brightness levels appear instead of two, making it possible to distinguish the three danger square wave pulses.

Figure 2:
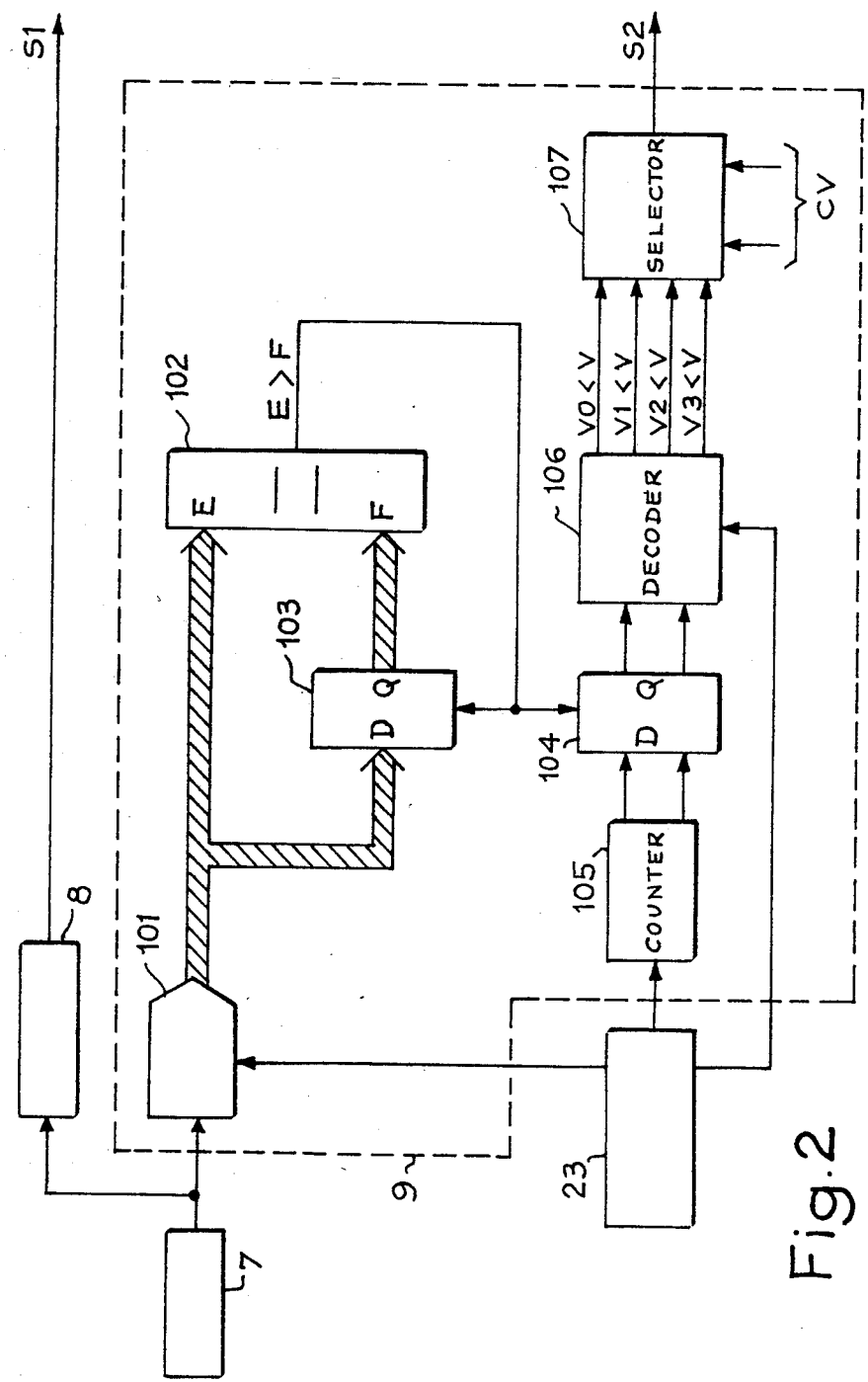
FIG. 2 is a diagram of the discriminator circuit 9.

An embodiment of the discriminator 9 is shown in FIG. 2 and firstly makes it possible to classify the targets as a function of their speed. Speed thresholds are determined from limiting Doppler frequencies, which thus subdivide the spectrum of the noise signal received into zones. In the present embodiment, the number of limit frequencies is five, so that there are four zones and consequently four speed thresholds. In order to determine the detected Doppler frequency, the amplitude of the signal is compared in pairs for each frequency. For this purpose, the circuit receives the output frequency from analyzer 7. An analog-digital converter 101 digitizes the data transmitted for each distance gate, transmits each word on the one hand to an input E of a comparator 102, whilst another anode input F receives the preceding word relating to the same gate and which has been stored with the aid of a group of type D flip-flops 103.

The output of the comparator is activated when $E>F$. When $E>F$, this output activates the clock of flip-flops 103, which release the new information.

When $E<F$, the flip-flops store the word present at input F. During this time, a counter 105, whose starting is synchronized with the transmission of the first word for each distance gate, counts from 0 to Z. In the present embodiment, Z equals 4, counting place on two bits and each bit is supplied to the data input of a type D flip-flop, whose box is designated 104. The clock of these flips-flops 105 is activated by the output of comparator 102, when $E>F$. For the first information, the counter will display zero and for the fourth information, the counter will display 3. However, the output of flip-flops 104 will display the last word stored. The output of flip-flops 104 is applied to the input of a decoder 106, which thus makes it possible to decode four speed levels $V>V0$, $V>V1$, $V>V2$, $V>V3$ and display the level corresponding to the information stored by flip-flops 105. The four outputs of the decoder are applied to the inputs of a selector, which also receives at its selection inputs, an external control CV, thus bringing about the intervention of a relative danger criterion, whilst taking account of the distance at which the detected target is located and permitting the selection of one of the four inputs at the output.

For example, if input V>V1 is at 1 and control CV selects this input, the output will be at 1. However, if the control CV has selected one of the inputs V>V2 or V>V3, it is then input V>V1 which is at 1 and the output will be at zero. The output signal S2 is constituted by one bit per distance gate indicating whether the target is very dangerous or moderately dangerous, as a function of whether it is fast or slow.

Figure 3:
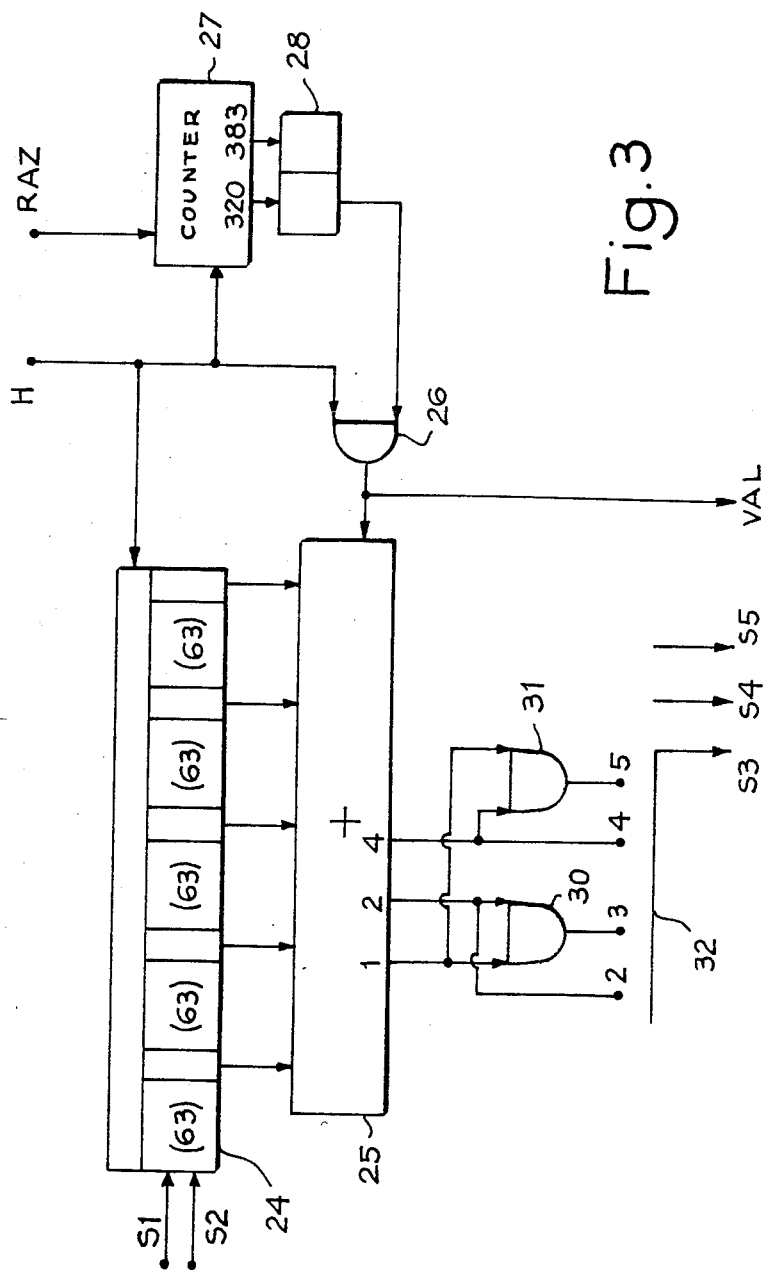
FIG. 3 is a diagram of the threshold discriminator circuit 10.

An embodiment of the threshold discriminator circuit 10 is shown in FIG. 3 in the special case of a radar having 64 distance gates and an analysis relating to five successive independent measurements. The bearing sweep takes place in constant steps corresponding to the discriminating power of the antenna, the number of steps being equal to 64.

The threshold circuit 10 has a shift register 24, which takes account of signals S1 and S2. This register 24 has 320 stages corresponding to the five successive measurements relating to 64 distance gates. This register is filled with signal S1 and then with signal S2 under the action of a clock signal H from the synchronizing and control circuit 23.

Five stages of this shift register, located after every 64 stages following the 64th stage, are provided with an independent output. Thus, when the register is entirely filled, there will be on these five special stages, five bits corresponding to the five independent measurements of the first distance gate. At the following clock time, there will be in these five registers, five bits corresponding to the second distance gate and so on up to the five bits corresponding to the 64th distance gate.

These five outputs are connected to an adder 25, which carries out the binary addition and thus gives the result on three output bits in parallel. Obviously, in this special case, these three output bits can only assume a certain number of states limited to the representation of the number 5.

In order that the adder only functions at the significant times, it receives clock H via an AND gate 26, which is only open between times 320 to 383 of the clock signal H, time 1 of said signal marking the entry of the first bit into the first stage of register 24.

This clock signal is applied to a counter 27 which also receives from synchronizing unit 23, a resetting signal RAZ during the entry into register 24 of the first bit of S1. Output 320 of this counter positions a R-S flip-flop 28, which then opens gate 26. At time 383 of signal H, counter 27 repositions the flip-flop 28, which then closes again gate 26.

The binary outputs 1, 2 and 4 of adder 25 are combined with the aid of two AND gates 30, 31 in order to obtain on the one hand directly and on the other hand via these said gates, four outputs 2, 3 4 and 5. The appearance of a bit 1 on one of these outputs indicates in the distance gate corresponding to the calculation time, a detection number of moving targets from among the five independent measurements equal to the output number.

A switch 32 makes it possible to select whichever of the outputs corresponds to the threshold which has been fixed. The appearance of a bit 1 on signal S3 at the output of this switch, thus indicates the detection of a moving target with the probability level selected by the switch. Output 1 of adder 25 is not transferred to switch 32, because in this case the second threshold circuit would be without interest.

After this first processing, the register takes into account signal S2 and carries out the same processing operation. The appearance of a bit 1 on signal S4 at the output of said switch, indicates the detection of a slow moving target and the appearance of a bit 1 on signal S5 indicates the detection of a fast moving target.

The buffer store 11 stores the 64 words of three bits corresponding to the 64 gates and releases them simultaneously with the scan signals on the instruction of signal VAL. The first stored bit is supplied to memory 14, the second is supplied to memory 15, the third to memory 16 and so on for the 64 words. The storage circuit 12, shown in FIG. 4, has in this embodiment three random-access memories 14, 15, 16, each having a capacity corresponding to the format of the screen, i.e. 64×64 bits, the coding of one point of the screen taking place on one bit. The synchronizing and control circuit manages the reading and writing operations in these memories and addresses three memories at the same time.

Figure 4:
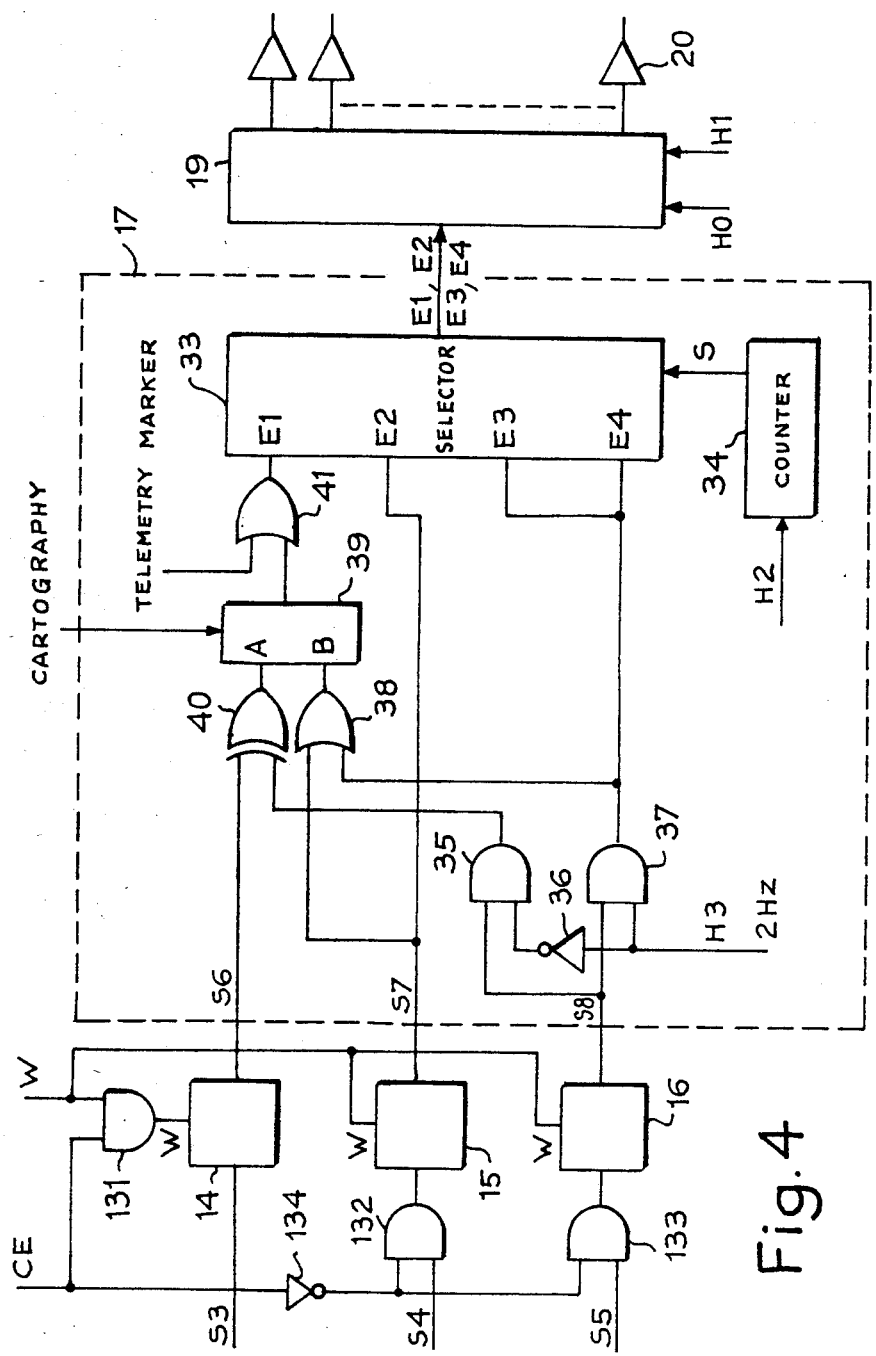
FIG. 4 is a diagram of the storage circuit 12.

The logic circuit 13 shown in FIG. 1 and whereof an embodiment is shown in FIG. 4 comprises an AND gate 131, whose input is connected to an external control CE making it possible to request a fixed echo abstract necessary during the use of the Doppler radar because, in normal operation, they only make it possible to detect moving echoes. A second input of gate 131 receives the writing control W supplied by circuit 23. The output of gate 131 is connected to writing input of memory 14 (receiving signal S3). To other AND gates 132, 133 respectively connected to memories 15 and 16 receive on one input signal $\overline{CE}$ by means of a reversing gate 134 and receive on the other input respectively signals S4 and S5. The content of memory 14 is therefore protected throughout the time when signals $\overline{CE}$ is present.

The multiplexer 17 shown in FIG. 4 comprises a system of logic gates, which are combined to supply three signals applied to the inputs of a selector 33, making it possible to select one output from among four with the aid of a counter 34. A first AND gate 35 receives at one input, the output signal from memory 16 containing the data on 64 detection bits from fast targets in 64 distance gates. This gate 35 also receives at a second input, a clock signal H3 (keyed to a frequency close to 2 Hz) via an inverter 36. The output signal of memory 16 is also applied to an input of a second AND gate 37, which receives at another input the clock signal H3. The output of gate 37 is connected to two inputs E3, E4 of selector 33. The output signal of memory 55 is applied to an input of an OR gate 38 and to an input E2 of selector 33. Another input of gate 38 receives the output signal from gate 37. The output of gate 38 is applied to an input B of another selector 39 making it possible to select one output from among two. At another input A, the selector 39 also receives the output signal from a NAND gate 40, whereof one input receives the output signal from memory 14 and the other receives the output signal from gate 38. Selector 39 is activated by an external control selecting the so-called "cartography" mode for the representation of fixed echoes, which makes it possible to take account of the signal corresponding to the detection of fixed targets, in order to display the radar landscape on the screen. The output of selector 39 is connected to an input of an OR gate 41, another input of this gate receiving a signal from an external control transmitted by a telemetry marker. This OR gate 41 makes it possible to superimpose a cross materializing the telemetry marker on the image. The output of gate 41 is connected to input E1 of selector 33. The output signal of selector 33 thus has data in series of 64 bits, each bit giving a presence or absence indication for each distance gate. The selection input S of selector 33 is activated by counter 34 controlled by signal H2 and makes it possible to obtain at the output the information of 64×64 bits in series, which was present at input E1, then at input E2, then at input E3 and then at input E4, in accordance with the time diagram of FIG. 5.

Shift register 19 is filled at frequency H0 with the 64 first bits corresponding to the selection of the first column on the screen and releases these bits in parallel on a clock pulse H1 in 64 s and then reiterates for the 64 columns. These data are amplified and are applied to electrodes Y. The scanning circuit transmits a signal, which scans the 64 electrodes X during a time equal to 64 cycles of clock H1. The selected points X and Y of the screen are illuminated and the first image represents the radar landscape with fixed and moving echoes. The second image represents the slow moving echoes and the third and fourth the fast moving echoes.

Thus, the fixed echoes are illuminated one time out of four, the slow moving echoes twice out of four and the fast moving echoes three times out of four. The 2 Hz clock signal transmitted to AND gates 35 and 37 makes it possible to inhibit the output signal of selector 33, when inputs E3 and E4 are selected in accordance with the time diagram shown in FIG. 5. Thus, every 500 ms and for 200 ms, the display signal of the fast moving targets is not transmitted to the screen in order to bring about a flashing or flickering which is visible to the eye in order to better locate the targets representing the greatest danger, apart from the overbrightness.

Figure 5:
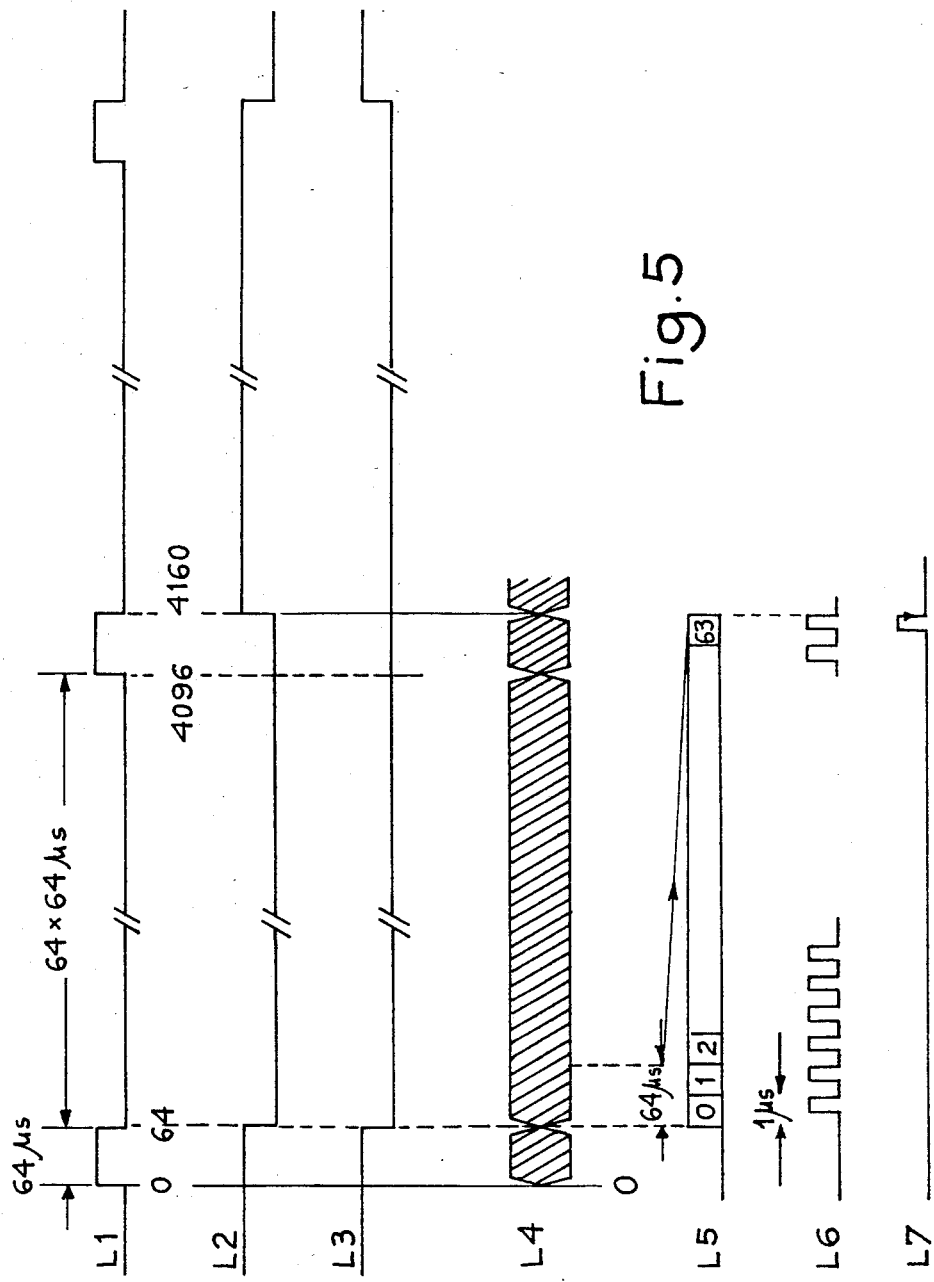
FIG. 5 is a diagram of the clock signal times.

The time diagram shown in FIG. 5 makes it possible to synthesize the operation of the storage circuit 12. The first line L1 represents the writing and reading cycle of the memories. In the present embodiment, the writing time lasts 64 μs and the reading time 4096 μs The second line L2 represents clock H2, i.e. the display cycle of a single output signal of selector 33, i.e. 4160 μs. The third line L3 represents the display cycle of the four output signals of the selector or the image frequency of the screen (4×4160 μs) which is approximately 60 Hz. The fourth line L4 represents the cycle of the addressing bus of memories 14, 15 and 16. Line L5 represents the counting of the 64 first bits. Line L6 represents the 1 MHz clock H0. Line L7 represents clock H1 of cycle 64 μs making it possible to validate the outputs of register 19.

Such an apparatus makes it possible to improve the display conditions when using a ground surveillance Doppler radar, whilst the equipment is only made slightly more complicated.

What is claimed is:

1. A ground surveillance Doppler radar of the type comprising a transmitter for transmitting recurrent pulses of given frequency; a receiver for receiving these pulses subject to a Doppler modulation and for supplying an incoming signal formed from video frequency carrier pulses of the same modulation; storage and selection means for isolating in said incoming signal at least one group of recurrent video frequency pulses corresponding to a given distance gate; spectral analysis means for forming a signal indicating the Doppler modulation lines of the pulses from said group of pulses; a first threshold circuit for discriminating these lines from the noise and for supplying a signal indicating the presence or absence of moving targets in the distance gates; a display means making it possible to locate these targets; and wherein said radar further comprises a discriminator making it possible to classify the detected targets as a function of their speed into classes representing relative degrees of danger; a second threshold circuit receiving k successive binary informations relative to each distance gate for each input signal from the discriminator and the threshold circuit, making it possible to store these k informations (k being an integer equal to or greater than 2) and supplying a binary signal indicating the presence or absence of a target for each class with probability of 1 among k (1 being an integer equal to or less than 2); a storage circuit making it possible to independently store the informations contained in the signals relative to each class for each distance gate and to supply an output signal containing the informations for all the distance gates in sequential series for each class; a fluorescent screen of the matrix type comprising first and second electrode systems; and a scanning control circuit controlling the first system of electrodes, the second system of electrodes being controlled by the output signal of the storage circuit, which thus makes it possible to locate the targets and distinguish those representing the greatest danger by an overbrightness and a flashing or flickering on the screen.

2. A ground surveillance Doppler radar according to claim 1, wherein the discriminator comprises an analog-digital converter receiving the output signal from the spectral analyzer and supplying a digital signal; a comparator having a first and a second input, the first input receiving the digital signal and supplying an output signal; a type D flip-flop receiving this digital signal and supplying it at a given time to the second input of the comparator; a speed discriminator with Z output levels (z being an integer equal to or greater than 2) activated by the output signal of the comparator; and a selector connected to each output level of the discriminator, making it possible to select one level from among Z in accordance with an external control signal.

3. A ground surveillance Doppler radar according to claim 2, wherein the speed discriminator comprises a counter by Z, a type D flip-flop, the output of the comparator being applied to the input of the type D flip-flop, which receives at its clock input the output signal of said comparator and a decoder receiving at the input, the output signal from the said flip-flop and supplying Z levels corresponding to the Z speed thresholds.

4. A ground surveillance Doppler radar according to claim 1, wherein the second threshold circuit comprises a shift register making it possible to store k successive informations and supplying on k outputs in parallel, the k first bits corresponding to a distance gate and wherein the second threshold circuit comprises an adder making it possible to store these k first bits, synchronization means for controlling the filling of the shift register and the adder and means for selecting one output of the adder between 2 and k and for supplying the binary signal.

5. A ground surveillance Doppler radar according to claim 1, wherein the storage circuit comprises a group of read-only memories, whose capacity is a function of the screen dimensions, each containing the information relative to said classes for n distance gates and n bearing values of the antenna, as well as a multiplexer sequentially receiving in parallel the data relating to each class given by the memories and supplying data in series for each class.

6. A ground surveillance Doppler radar according to claim 5, wherein the number of classes is at least equal to 3, the storage circuit then comprising a first, a second and a third memory.

7. A ground surveillance Doppler radar according to claim 4 or 5, wherein the multiplexer comprises a first AND gate with two inputs, an output, receiving at one of its inputs the output signal from one of the memories and receiving at the other input a clock signal; a reversing gate which also receives the clock signal and which supplies the reversed clock signal; a second AND gate with two inputs, an output, receiving the said reversed clock signal at one of its inputs and receiving the output signal from the first memory at the other input; a first OR gate with two inputs, an output, receiving the output signal from the second memory and receiving the output signal from the first AND gate; an EXCLUSIVE-OR gate with two inputs, an output, receiving the output signal of the third memory and the output signal of the second AND gate; a first selector with two inputs, an output, receiving the output signal from the EXCLUSIVE-OR gate and the output signal from the OR gate; a second OR gate with two inputs, an output, receiving the output signal from the selector and an external signal; and a second selector with three inputs, an output, receiving at a first input the output signal from the second OR gate, receiving at the second input the output signal from the second memory and receiving at the third input the output signal from the first AND gate and supplying at the output, at a given time, one of the input signals.

8. A ground surveillance Doppler radar according to claim 5, wherein the storage circuit comprises a logic circuit making it possible to inhibit the writing input of each of these random-access memories on instruction from an external control.

9. A ground surveillance Doppler radar according to claim 1, wherein it comprises an interface circuit incorporating a shift register, which is filled with n bits arriving in series and supplying these n bits in parallel and a group of n amplifiers, each connected to an output of the register, in order to adapt the signal applied to each electrode of the second group.

10. A ground surveillance Doppler radar according to claim 1, wherein it comprises a buffer store connecting the second threshold circuit to the storage circuit, in order to subject the input data to a speed change.

* * * * *